UNITED STATES PATENT OFFICE.

GEORGE H. EARP-THOMAS, OF GLEN RIDGE, NEW JERSEY.

FERTILIZER AND PROCESS OF MAKING SAME.

1,309,723.  Specification of Letters Patent.  Patented July 15, 1919.

No Drawing.  Application filed April 10, 1917. Serial No. 160,960.

*To all whom it may concern:*

Be it known that I, GEORGE H. EARP-THOMAS, formerly a citizen of New Zealand, but who have declared my intention of becoming a citizen of the United States, residing at Glen Ridge, in the county of Essex and State of New Jersey, have invented certain new and useful Improvements in Fertilizers and Processes of Making Same; and I do hereby declare the following to be a full, clear, and exact description of the invention, such as will enable others skilled in the art to which it appertains to make and use the same.

This invention relates to fertilizers and processes of making same; and it comprises growing suitable nitro-bacteria in the presence of material, especially a phosphatic or potassiferous mineral, containing plant food in unavailable form, whereby such material is modified and rendered suitable for fertilizer purposes.

In particular the invention is concerned with the treatment of raw phosphate rock, e. g., apatite, phosphorite, "land rock", etc., with humus, peat, muck, or the like, carrying ammonifying, nitrifying and nitrogen-fixing bacteria, the conditions of treatment being such that the insoluble tricalcium phosphate of the raw mineral becomes wholly or in part converted into a form or forms, such as mono-, di-, or tetra-calcium phosphate, in which the phosphoric acid is relatively soluble and available as plant food. Aside from this decomposing action on the mineral, the nitro-bacteria present in the resultant material also exert a beneficial action on the soil upon which the material is used as a fertilizer, by increasing its available nitrogen content. The material may be made a complete fertilizer by adding potash salts thereto; or a mixture of phosphate rock and a potassiferous mineral, such as feldspar, may be acted upon in the first instance by decomposing bacteria, that is, bacteria capable of effecting decomposition, resulting in the production of a fertilizer containing both potash and phosphoric acid in available form, as well as beneficial bacteria.

It has been the practice heretofore to treat raw phosphate rock with sulfuric acid to render its contained phosphoric acid available as plant food. But this method involves considerable expense and technical difficulty. It is still more difficult and expensive, according to methods heretofore proposed, to render available the potash contained in natural minerals such as feldspar, alunite, leucite, etc. In contrast to such methods, the present invention affords a ready and comparatively inexpensive way of solubleizing or rendering available the fertilizer values locked up in many minerals, especially phosphatic and potassiferous minerals; and furthermore the resultant product is more effective and valuable as a fertilizer than the products obtained by said other methods.

In order to explain clearly the principles of the invention, the application thereof to the treatment of raw phosphate rock will be described in detail. As above pointed out, however, the invention is broad in scope and accordingly the specific explanation hereinafter given is to be understood as illustrative and not limiting.

The first requirement is a suitable material, at least partly organic in character, to serve as a carrier and nutrient medium for the bacteria to be used. Humus-like or humus-containing material, of which humus, muck, peat, etc., are typical, is most desirable for this purpose, and peat itself is peculiarly adapted, by reason of its composition and other characteristics, to give good results. In preparing it for use, the peat is thoroughly drained in the field and is then worked frequently until it is well aerated and in good productive condition. It is then collected, sun dried or artificially dried, and generally sterilized by streaming steam or dry heat to destroy its microscopical life as well as any weed seeds that may be present. By this treatment, the peat may be freed from molds and harmful bacteria. A careful grinding or sifting puts the dried peat in good condition for further treatment. If the peat available is acid in reaction, this should be corrected by the addition of alkaline or antacid substances such as well slaked lime, calcium carbonate, carbonates of potash, soda, magnesia, etc., for the reason that a slightly alkaline medium is most favorable to growth of the bacteria employed in the present process. It is also desirable to increase the nutrient properties of the peat or humus and its efficiency as a medium for bacterial growth by adding small percentages of sugar, glucose, ground sprouted barley, ground malt, extract of malt, waste products from sugar manufacture, water, or the like; and finely ground sea weed, kelp, wood ashes, or potash-bearing rock. A small amount of sulfur in the mixture also has an excellent effect; and adding an ammonium salt, such as ammonium sulfate, is particularly effective in initiating and promoting bacterial growth. Any or all of these ingredients, and others of similar character, may be used to promote bacterial activity; the choice of ingredients and the proportions thereof depending upon the character and composition of the particular lot of peat undergoing preparation, and upon the particular species of bacteria to be used.

In practice it is generally most convenient to thoroughly mix together the prepared peat or humus and the finely divided rock phosphate. To insure the best results, it is best to use phosphate rock which has been ground to fine mesh. Where the peat used is of good quality and comparatively high in organic nutrient matter, a complete mixture ready for inoculation may be made up in substantially the following proportions, per ton.

| | |
|---|---|
| Finely ground raw phosphate rock | 900 pounds |
| Moist sifted peat or humus | 925 " |
| Calcium carbonate | 100 " |
| Wood ashes | 65 " |
| Ammonium sulfate | 5 " |
| Extract of malt | 5 " |

Sufficient tap-water to allow for evaporation.

This mixture is inoculated with a pure culture, or with mixed cultures of suitable nitro-bacteria and peptonizing bacteria. The term nitro-bacteria is here used to designate generically such bacteria as ammonifying bacteria, nitrifying bacteria (nitrosomonas), nitrate bacteria, (nitrobacter), nitrogen-fixing bacteria, both symbiotic (pseudomonas radicicola) such as infest the roots of legumes, and non-symbiotic (azotobacter); also certain nitrogen-fixing bacteria such as clostridium pasteurianum, for example, and others which I have not identified by species, but whose presence, though not essential, seems to have a desirable stimulating effect upon the growth of the other bacteria above mentioned. Virulent cultures of the various bacteria required, either pure or mixed, can be prepared to best advantage by methods set forth, for example, in my prior Patents Nos. 816,850 and 865,965; and inoculation of the prepared peat and phosphate rock mixture therewith can be effected by suitably diluting the agar-agar or other original culture with water, and sprinkling it upon the mixture which is thoroughly stirred meanwhile.

In practice it is found most desirable to use mixed cultures of ammonifying, nitrifying and nitrogen-fixing (symbiotic and non-symbiotic) bacteria for inoculating the peat, as most efficient conversion of the raw phosphate rock is thereby attained, and at the same time the resultant fertilizer material is also especially desirable as a means for distributing legume bacteria and for application to the soil.

It will be seen that in the foregoing specific example the moistened humus material constitutes roughly about one-half of the mixture; and while the proportions may be varied considerably in practice, it is usually desirable to have the humus material or its equivalent, together with the other ingredients added to promote bacterial growth, constitute a large or even a major proportion of the mixture, so that the converting bacteria may flourish and multiply rapidly.

Instead of mixing the peat and phosphate rock before inoculating, either the peat or the rock may be first inoculated, and mixture effected afterward. It is often desirable to sterilize the phosphate rock also before using it.

It is of course immaterial for the purposes of this invention what may be the true explanation of the decomposing or solubleizing action of the bacteria on the raw phosphatic rock in the foregoing example; but a probable explanation seems to be that the ammonifying bacteria decompose the organic nutrient material of and in the humus, forming ammonia and organic acids; and that the nitrifying or nitrite bacteria convert the ammonia into nitrous acid, which reacts with the tri-calcium phosphate of the phosphate rock to give soluble di-calcium or mono-calcium phosphate, or both, and calcium nitrite. If nitrate bacteria (nitrobacter) are present, the nitrite eventually is oxidized to nitrate.

Whatever may be the correct explanation, the fact remains that raw rock phosphate, when mixed with inoculated humus as herein described, undergoes a conversion which renders its phosphoric acid available. The rate of conversion depends upon various factors such as temperature, intensity of inoculation, etc., and is accordingly controllable within certain limits. It is practicable to ship the inoculated material to the dealer or farmer at once; but in order to insure a virulent growth and large numerical increase of the active microörganisms, with resultant high efficiency in the decomposing or converting action on the phosphate rock, it is much better to store the material for some time at a temperature favorable to bacterial development. As a rule, storage at approximately 25° C. for a period of from 35 to 50 days gives an abundant growth of highly actice bacteria and a sufficiently high degree of conversion of insoluble phosphate into available form to render the product ready for market.

As aids to nitro-bacteria in the conversion process of the present invention may be employed other acid-producing bacteria, lactic acid and butyric acid bacteria, for example, being very efficient when used in conjunction with nitro-bacteria in the manner above set forth.

The fertilizer material obtained as described may be modified to give a complete fertilizer by mixing with it compounds of potash and nitrogen, for example, in suitable proportions for any desired formula.

In treating potash-bearing minerals, such as feldspar, gneissalunite and leucite, or other minerals containing plant food in unavailable form, in accordance with the invention, the procedure is similar in general to that herein recommended for the treatment of raw phosphate rock.

What I claim is:

1. The process of preparing a fertilizer which comprises subjecting finely divided raw phosphate rock to the decomposing action of nitro-bacteria in the presence of an admixed humus-like material which has been treated to improve it as a culture medium.

2. The process of preparing a fertilizer which comprises treating peat or humus to remove acidity, adding thereto a promoter of bacterial activity, admixing finely divided phosphatic rock, and inoculating the mixture with nitro-bacteria in virulent condition to effect decomposition of the phosphate rock.

3. The process of preparing a fertilizer which comprises inoculating humus with nitro-bacteria and other acid-producing bacteria, and subjecting raw phosphate rock to the decomposing action of the inoculated humus.

4. The process of preparing a fertilizer which comprises subjecting a mineral containing plant food in unavailable form to the decomposing action of nitro-bacteria in the presence of an admixed humus-like material which has been treated to improve it as a culture medium.

5. The process of preparing a fertilizer which comprises preliminarily treating humus-like material to improve it as a medium for bacteria, intimately mixing the treated material with a finely divided mineral containing plant food in unavailable form, and inoculating the mixture with ammonifying, nitrifying and nitrogen-fixing bacteria to render the plant food in said mineral available.

6. The process of preparing a fertilizer which comprises intimately commingling humus-like material, and finely divided phosphatic and potassiferous minerals, with ammonifying, nitrifying, and nitrogen-fixing bacteria, to effect a chemical change in said minerals.

7. The process of preparing a fertilizer which comprises growing nitro-bacteria and lactic acid bacteria in a mixture of humus and a mineral containing plant food.

8. The process of preparing a fertilizer which comprises subjecting an intimate mixture of finely divided phosphatic and potassiferous minerals with humus-like material to the decomposing action of nitro-bacteria.

9. The process of treating mineral matter to render available plant food contained therein in unavailable form which comprises subjecting such mineral matter to the decomposing action of humus-like material inoculated with nitro-bacteria.

10. The process of treating mineral matter to render available plant food contained therein in unavailable form which comprises subjecting such mineral matter to the decomposing action of humus-like material inoculated with nitro-bacteria, said humus-like material containing an added substance serving to promote bacterial activity.

11. The process of preparing a fertilizer containing available phosphoric acid which comprises mixing peat or humus, finely divided phosphate rock, and an antacid substance, and inoculating the mixture with bacteria capable of exercising a decomposing action on said phosphate rock.

12. The process of preparing a fertilizer containing available phosphoric acid which comprises mixing peat or humus, finely divided phosphate rock, a suitable antacid substance, and nutrient material, and inoculating the mixture with bacteria capable of exercising a decomposing action on said phosphate rock.

13. The process of preparing a fertilizer containing available phosphoric acid which comprises inoculating phosphate rock with selected nitro-bacteria capable of exercising a decomposing action thereon, and maintaining the inoculated rock under incubating conditions until a substantial proportion of the phosphoric acid of said rock has been rendered available for plant food.

14. The process of preparing a fertilizer which comprises inoculating phosphate rock with nitrifying bacteria and maintaining the inoculated rock at a favorable incubating temperature until a substantial proportion of the phosphoric acid of said rock has been rendered available for plant food.

15. The process of preparing a fertilizer which comprises preparing a mixture of finely divided phosphate rock, a nutrient medium, and ammonifying, nitrifying, and nitrogen-fixing bacteria, and maintaining the inoculated mixture under incubating conditions until a substantial proportion of the phosphoric acid of said rock has been rendered available for plant food.

16. The process of preparing a fertilizer which comprises preparing a mixture consisting mainly of finely divided phosphate rock and humus-like material, said mixture also containing a small percentage of an ammonium salt and being inoculated with nitrifying bacteria, and maintaining the mixture under suitable incubating conditions to effect conversion of said phosphate rock.

17. The process of preparing a fertilizer which comprises preparing a mixture of finely divided phosphate rock and a culture medium for bacteria, said mixture being inoculated with nitro-bacteria and said culture medium constituting a relatively large proportion of the mixture, and incubating the mixture.

18. The process of preparing a fertilizer which comprises preparing a mixture of finely divided phosphate rock, humus-like material, and agents promoting bacterial growth, the mixture being inoculated with cultures of several different kinds of nitro-bacteria, and the phosphate rock constituting not more than about one-half of the mixture, and maintaining the mixture at approximately 25° C. for a period of time sufficient to effect extensive conversion of the phosphate rock.

19. A fertilizer composition comprising humus-like material inoculated with nitro-bacteria and containing an added promoter of bacterial activity, in intimate mixture with a finely divided mineral naturally containing plant food in unavailable form but modified *in situ* by said inoculated material.

20. A fertilizer composition comprising inoculated humus material intimately admixed with phosphate rock chemically modified by said inoculated humus material.

21. A fertilizer composition comprising humus material inoculated with nitrifying and nitrogen-fixing bacteria, intimately admixed with phosphate rock chemically modified by said inoculated humus material.

22. The process of preparing a fertilizer which comprises subjecting a mixture of natural phosphatic and potassiferous minerals to the decomposing action of nitro-bacteria in the presence of a food for bacteria.

23. The process of preparing a fertilizer which comprises growing nitro-bacteria and lactic acid bacteria in a mixture comprising a food for bacteria and a mineral containing plant food.

24. The process of treating mineral matter to render more available plant food contained therein, which comprises growing bacteria in a mixture comprising said mineral matter, a bacteria food, and sulfur, the bacteria employed being capable of acting in the mixture to render the contained plant food more available.

25. The process of treating mineral matter to render more available plant food contained therein, which comprises growing nitro-bacteria in a mixture comprising said mineral matter, a bacteria food, and sulfur.

26. The process of treating phosphatic mineral matter to render available phosphoric acid contained therein, which comprises growing nitro-bacteria in a mixture comprising said mineral matter, a nutrient medium, and sulfur.

27. The process of treating phosphate rock which comprises subjecting phosphate rock to the decomposing action of a slightly alkaline culture medium containing sulfur and inoculated with suitable nitro-bacteria.

28. The process of treating mineral matter to render available plant food contained therein, which comprises growing nitro-bacteria in a mixture comprising such mineral matter and a malt nutrient.

29. The process of treating mineral matter to render available plant food contained therein, which comprises growing nitro-bacteria in a mixture comprising such mineral matter and ground sprouted barley.

30. A fertilizer composition comprising fertilizer-containing mineral matter mixed with nutrient and carrier material containing sulfur and carrying bacteria capable of acting in the mixture to render more available fertilizer contained in said mineral matter.

31. A fertilizer composition comprising phosphate rock, mixed with nutrient and carrier material containing sulfur and carrying bacteria capable of acting in the mixture to render the phosphoric acid content thereof more available.

32. A fertilizer composition comprising phosphate rock, mixed with nutrient and carrier material containing sulfur and carrying nitrifying bacteria.

33. A fertilizer composition comprising phosphate rock, mixed with nutrient and carrier material containing sulfur and carrying ammonifying, nitrifying and nitrogen-fixing bacteria.

34. The process of preparing a fertilizer material which comprises preparing a mixture of a finely-divided phosphatic mineral with selected nitro-bacteria and a food for said bacteria, and maintaining the mixture at a temperature not substantially less than about 25° C. to promote development of said bacteria and thereby to render the phosphoric acid content of said mineral more available.

35. The process of preparing a fertilizer material which comprises subjecting material containing compounds of both phosphorus and potassium chiefly in relatively unavailable form to the decomposing action of selected bacteria in the presence of a food for bacteria.

In testimony whereof I hereunto affix my signature.

GEORGE H. EARP-THOMAS.